(12) United States Patent
Saneyoshi et al.

(10) Patent No.: US 10,931,208 B2
(45) Date of Patent: Feb. 23, 2021

(54) ELECTROSTATIC ACTUATOR AND METHOD FOR MANUFACTURING ELECTROSTATIC ACTUATOR

(71) Applicant: STRAWB INC., Yokohama (JP)

(72) Inventors: Keiji Saneyoshi, Tokyo (JP);
Masatoshi Nakata, Tokyo (JP)

(73) Assignee: STRAWB INC., Yokohama (JP)

( * ) Notice: Subject to any disclaimer, the term of this patent is extended or adjusted under 35 U.S.C. 154(b) by 558 days.

(21) Appl. No.: 15/573,994

(22) PCT Filed: Jul. 6, 2016

(86) PCT No.: PCT/JP2016/069990
§ 371 (c)(1),
(2) Date: Nov. 14, 2017

(87) PCT Pub. No.: WO2017/010367
PCT Pub. Date: Jan. 19, 2017

(65) Prior Publication Data
US 2018/0294743 A1    Oct. 11, 2018

(30) Foreign Application Priority Data

Jul. 14, 2015  (JP) .............................. JP2015-140386

(51) Int. Cl.
*B32B 7/12* (2006.01)
*H02N 1/00* (2006.01)
*B32B 37/12* (2006.01)

(52) U.S. Cl.
CPC .............. *H02N 1/006* (2013.01); *B32B 7/12* (2013.01); *B32B 37/12* (2013.01); *B32B 2307/204* (2013.01); *B32B 2457/00* (2013.01)

(58) Field of Classification Search
USPC ......................................................... 310/309
See application file for complete search history.

(56) References Cited

U.S. PATENT DOCUMENTS

| | | | | |
|---|---|---|---|---|
| 6,646,364 | B1 * | 11/2003 | Horning | ................ B81B 3/0021 |
| | | | | 310/309 |
| 2005/0067919 | A1 | 3/2005 | Horning | |
| 2008/0266746 | A1 | 10/2008 | Handa et al. | |

FOREIGN PATENT DOCUMENTS

| | | |
|---|---|---|
| JP | 2004-502562 A | 1/2004 |
| JP | 2008-277446 A | 11/2008 |
| JP | 2013-243805 A | 12/2013 |
| WO | 02/05413 A2 | 1/2002 |

OTHER PUBLICATIONS

Sep. 30, 2018 Office Action issued in Chinese Patent Application No. 201680039239.7.

(Continued)

*Primary Examiner* — Terrance L Kenerly
(74) *Attorney, Agent, or Firm* — Oliff PLC (57) ABSTRACT

There are provided a plurality of first electrode plates in each of which an adhesive is applied on one surface in a first pattern, and a plurality of second electrode plates in each of which the adhesive is applied on one surface in a second pattern which is different from the first pattern, in which the plurality of first electrode plates and the plurality of second electrode plates are alternately stacked without causing the surfaces on which the adhesive is applied to face each other.

6 Claims, 9 Drawing Sheets

(56) References Cited

OTHER PUBLICATIONS

Oct. 23, 2018 Office Action issued in Korean Patent Application No. 10-2017-7033794.
Apr. 22, 2019 Korean Office Action issued in Korean Patent Application No. 10-2017-7033794.
May 7, 2019 Japanese Office Action issued in Japanese Patent Application No. 2015-140386.
Jan. 29, 2019 European Search Report issued in European Patent Application No. 16824347.5.
Jan. 16, 2018 International Preliminary Report on Patentability issued in Patent Application No. PCT/JP2016/069990.
Dec. 9, 2019 Taiwanese Office Action issued in Taiwanese Patent Application No. 105121956.
Jul. 5, 2019 Chinese Office Action issued in Chinese Patent Application No. 201680039239.7.
Oct. 4, 2016 Search Report issued in International Patent Application No. PCT/JP2016/069990.
Jun. 16, 2020 Office Action issued in European Patent Application 16824347.5.

* cited by examiner

FIG.9B ial Application Number 2015-140386, filed on Jul. 14, 2015, the entire contents of which are incorporated herein by reference.

TECHNICAL FIELD

The present invention relates to an electrostatic actuator and a manufacturing method of the electrostatic actuator.

BACKGROUND ART

An electrostatic actuator can obtain a large driving force while having a light weight, and thus it is expected as a power source as an alternative to a motor or the like utilizing a magnetic force. For example, a large number of electrodes are stacked in an electrostatic actuator, and the electrostatic actuator expands or contracts in accordance with a voltage applied to a place between the stacked electrodes.

There has been proposed a technique regarding an electrostatic actuator having a large plate area and capable of being manufactured more easily when compared to a conventional one, by stacking electrode plates which are generated in a manner that a plurality of electrode tapes are plain-woven in a mutually crossed manner (refer to Patent Document 1, for example).

PRIOR ART DOCUMENT

Patent Document

Patent Document 1: Japanese Unexamined Patent Application Publication No. 2013-243805

DISCLOSURE

Problems to be Solved

In a conventional electrostatic actuator, it is possible to increase a plate area by increasing a number of plain-woven electrode tapes. However, in accordance with the increase in the number of electrode tapes, it takes a long time to generate electrode plates through plain weave, which is a problem. Further, when the electrode tapes are plain-woven, the electrode tapes are subjected to bending and the like, so that it may be difficult to downsize the electrostatic actuator.

A proposition of the present invention is to provide an electrostatic actuator capable of being generated more easily when compared to a conventional one, even when it has a large plate area, and a manufacturing method of the electrostatic actuator.

Means for Solving the Problems

An embodiment of an electrostatic actuator which exemplifies the present invention includes a plurality of first electrode plates in each of which an adhesive is applied on one surface in a first pattern, and a plurality of second electrode plates in each of which the adhesive is applied on one surface in a second pattern which is different from the first pattern, in which the plurality of first electrode plates and the plurality of second electrode plates are alternately stacked without causing the surfaces on which the adhesive is applied to face each other.

An embodiment of a manufacturing method of an electrostatic actuator which exemplifies the present invention includes generating a plurality of electrode plates sandwiched by dielectrics having a predetermined thickness, using a part of the plurality of electrode plates as a plurality of first electrode plates and applying an adhesive on one surface of each of the plurality of first electrode plates in a first pattern, using the rest of the plurality of electrode plates as a plurality of second electrode plates and applying the adhesive on one surface of each of the plurality of second electrode plates in a second pattern which is different from the first pattern, and alternately stacking the plurality of first electrode plates and the plurality of second electrode plates without causing the surfaces on which the adhesive is applied to face each other.

With the present invention, an electrostatic actuator can be generated more easily when compared to a conventional one, even when it has a large plate area.

DETAILED DESCRIPTION OF THE EMBODIMENTS

Hereinafter, embodiments will be described based on the drawings.

Figure 1:
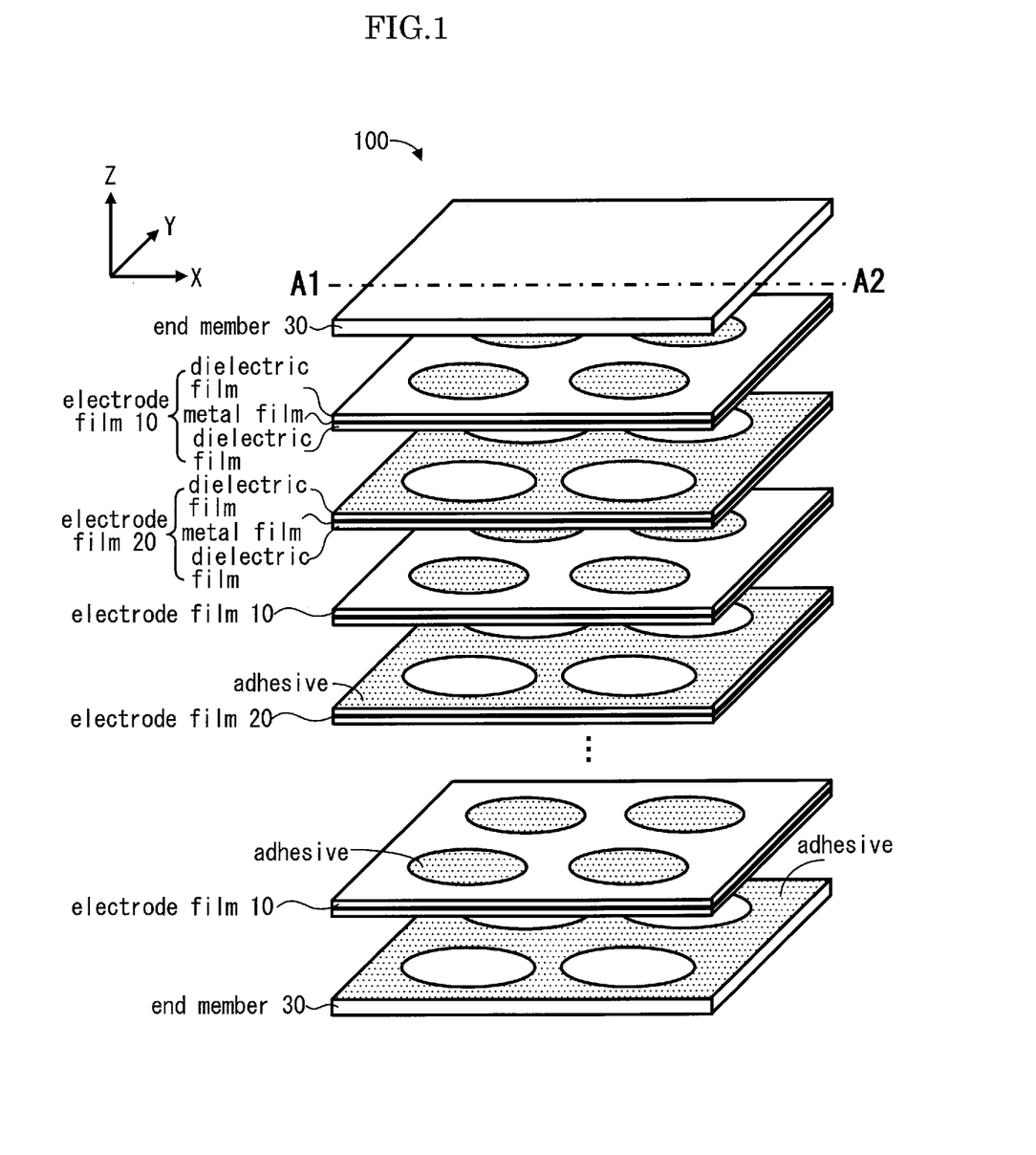
FIG. 1 is a view illustrating one embodiment of an electrostatic actuator.

FIG. 1 illustrates one embodiment of an electrostatic actuator.

An electrostatic actuator 100 illustrated in FIG. 1 is a stacked electrostatic actuator in which electrode films 10 and electrode films 20 on each of which an adhesive indicated by a half-tone dot meshing is applied, are alternately stacked in a Z axis direction illustrated in FIG. 1, and sandwiched by two end members 30 made of acrylic plates or the like.

Each of the electrode films 10 and 20 is an electrode plate obtained in a manner that, for example, a metal film made of copper or the like is sandwiched by dielectric films such as PET (Polyethylene Terephthalate) films. A thickness of each of the electrode films 10 and 20 is 8 micrometers or the like, for example. On respective upper side surfaces in the Z axis direction of the electrode films 10 and 20, an adhesive of silylated urethane or the like is applied in mutually different patterns, for example.

Figure 2A:
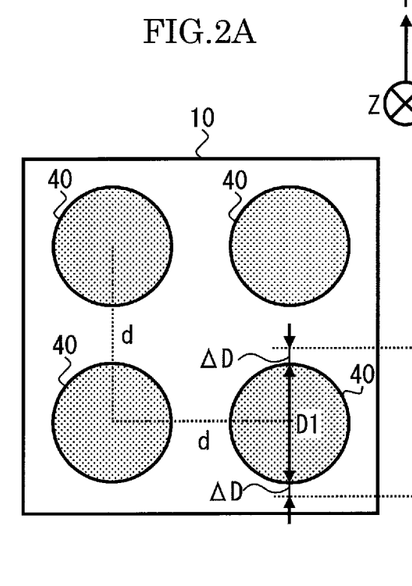
FIG. 2 are views illustrating one example of patterns in which an adhesive is applied on electrode films illustrated in FIG. 1.
Figure 2B:
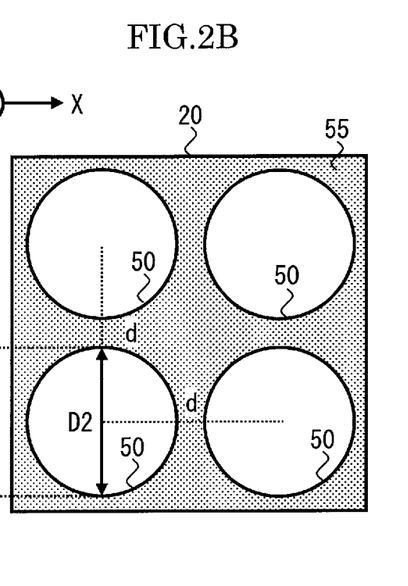

FIG. 2 illustrate one example of patterns in which the adhesive is applied on the electrode films 10 and 20 illustrated in FIG. 1. FIG. 2A illustrates regions where the adhesive is applied on the electrode film 10, and FIG. 2B illustrates a region where the adhesive is applied on the electrode film 20.

As illustrated in FIG. 2A, in the electrode film 10, the adhesive is applied on each of four circular regions 40 arranged at equal intervals with a distance d being a distance between centers and mutually having the same shape, for example. On the other hand, in the electrode film 20, the adhesive is applied on a region 55 which does not include four circular regions 50 arranged at equal intervals with a distance d being a distance between centers and mutually having the same shape so as to correspond to the respective regions 40, for example, as illustrated in FIG. 2B. The circular regions 40 in the electrode film 10 and the circular regions 50 in the electrode film 20 are arranged in a concentric state when seen from the Z axis direction at a time of overlapping the electrode film 10 and the electrode film 20.

A diameter of each of the circular regions 40 in the electrode film 10 is D1, and a diameter of each of the circular regions 50 in the electrode film 20 is D2. Note that the diameter D2 of the region 50 is larger than the diameter D1 of the region 40 by 2ΔD, as illustrated in FIG. 2. Specifically, when the electrode film 10 and the electrode film 20 are overlapped, there is a gap with a width ΔD between the region 40 and the region 50. For example, when the diameter D1 of the region 40 is 1 to 2 millimeters, the width ΔD of the gap is set to 100 micrometers. The gap with the width ΔD operates as a hinge portion when the electrostatic actuator 100 expands or contracts because of elasticity possessed by the electrode films 10 and 20. A distance between the electrode film 10 at the region 40 and the electrode film 20 at the region 50 can be limited to within 2ΔD, and an electrostatic force generated between the electrode film 10 at the region 40 and the electrode film 20 at the region 50 can be maintained to be larger than a predetermined value.

Note that the diameter D1 of the region 40, the diameter D2 of the region 50, and a size of the width ΔD of the gap may also be appropriately determined in accordance with the expanding and contracting operation required of the electrostatic actuator 100. For example, it is also possible to determine the diameter D1 of the region 40, the diameter D2 of the region 50, and the size of the width ΔD of the gap so that a total area of the regions 40 on which the adhesive is applied and the area of the region 55 on which the adhesive is applied become mutually equal.

A shape of the regions 40 and 50 may also be an oval shape, or a triangular shape, a quadrangular shape, or the like whose corners are rounded. When the regions 40 and 50 have the circular shape, the oval shape, or the shape with rounded corners, the electrostatic actuator 100 can suppress distortion which occurs in the electrode films 10 and 20 in accordance with the expanding and contracting operation (specifically, it is possible to disperse a stress). Accordingly, it is possible to save time taken for providing a cut, a hole, or the like in the electrode films 10 and 20 in order to disperse the stress.

Figure 3:
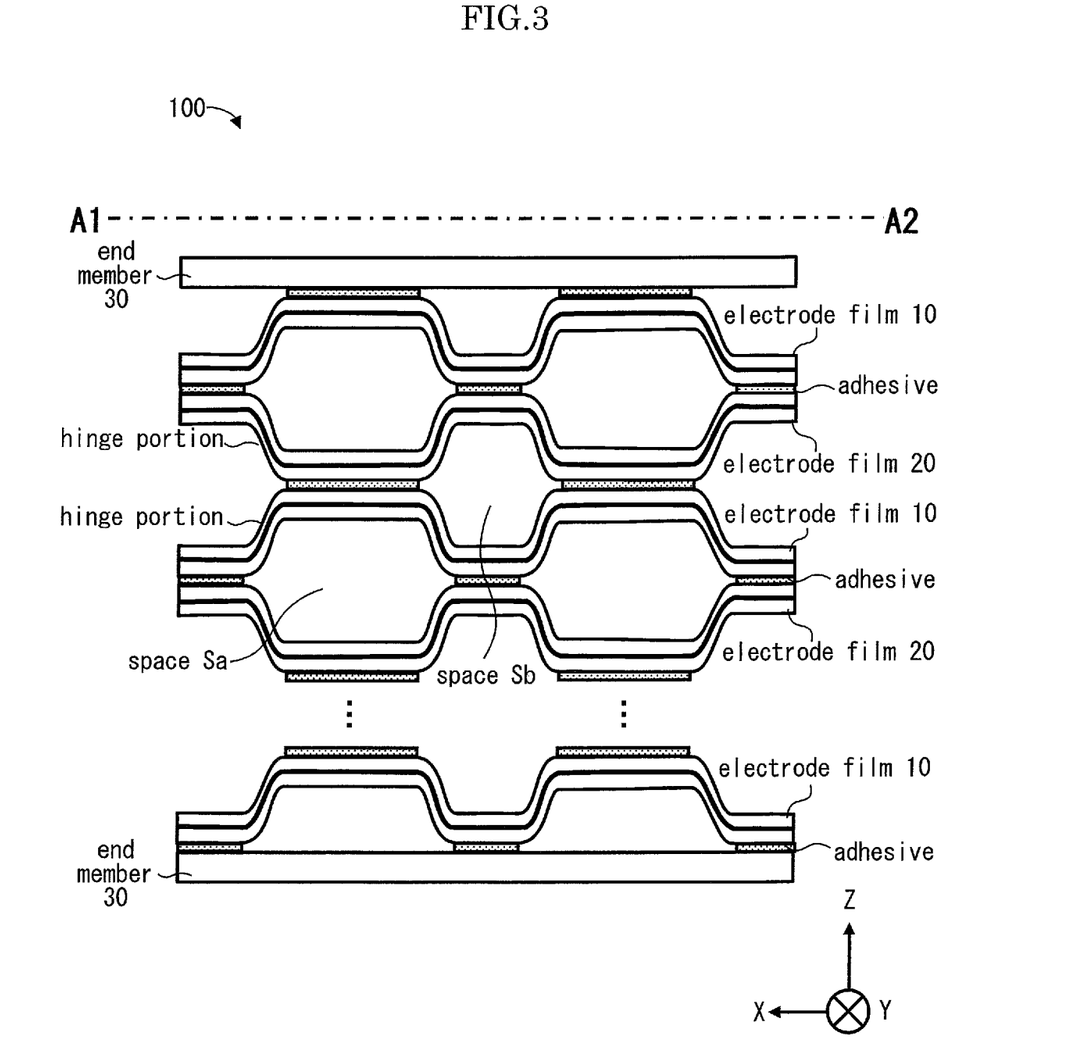
FIG. 3 is a view illustrating one example of a cross section of the electrostatic actuator in an XZ plane along a line segment illustrated in FIG. 1.

FIG. 3 illustrates one example of a cross section of the electrostatic actuator 100 in an XZ plane along a line segment A1-A2 illustrated in FIG. 1. In the electrostatic actuator 100, the electrode films 10 on which the adhesive is applied in the pattern illustrated in FIG. 2(a) and the electrode films 20 on which the adhesive is applied in the pattern illustrated in FIG. 2B are stacked in the Z axis direction. When the gap with the width ΔD operates as the hinge portion, the electrostatic actuator 100 has a plurality of spaces Sa with disk spring structures provided by the regions 40 and 50 and the gaps each having the width ΔD. The electrostatic actuator 100 also has a plurality of spaces Sb in each of which the gap with the width ΔD is set to the hinge portion. Note that the space Sa is formed at a position corresponding to that of the region 40 when seen from the Z axis direction, and the space Sb is formed at a position corresponding to that of the region 55 when seen from the Z axis direction. The spaces Sa and the spaces Sb are arranged in a staggered form in the XZ plane.

For example, when voltages with mutually different polarities are applied to the electrode films 10 and 20, respectively, electrostatic forces between the electrode films 10 and 20 in the spaces Sa and Sb are attracted to each other (specifically, the spaces Sa and Sb contract in the Z axis direction). On the other hand, when voltages each having the same polarity are applied to the electrode films 10 and 20, respectively, the electrostatic forces between the electrode films 10 and 20 in the spaces Sa and Sb repel each other (specifically, the spaces Sa and Sb expand in the Z axis direction). Accordingly, the electrostatic actuator 100 expands and contracts.

Note that each of the electrode films 10 and 20, and the end members 30 may also have a shape such as a triangular shape or a circular shape. Further, it is also possible that the adhesive is applied on the electrode films 10 and 20, and the end members 30, at a plurality of regions 40 whose number is other than four, or the region 55 having a plurality of regions 50.

FIG. 4 illustrate one example of regions on which the adhesive is applied when the electrode films 10 and 20 have a triangular shape and a circular shape. FIG. 4A illustrates a pattern in which the regions 40 on which the adhesive is applied are arranged when the electrode film 10 has a triangular shape. For example, circular regions 40 each having a diameter D1 are arranged in a pyramid form at mutually equal intervals with a distance d. FIG. 4B illustrates a pattern of the region 55 on which the adhesive is applied when the electrode film 20 has a triangular shape. For example, in the electrode film 20, circular regions 50 each having a diameter D2 and on which the adhesive is not applied are arranged at positions corresponding to those of the respective regions 40 illustrated in FIG. 4A (namely, positions arranged at mutually equal intervals with the distance d), and a region except for the circular regions 50 in the electrode film 20 corresponds to the region 55 on which the adhesive is applied.

Figure 4A:
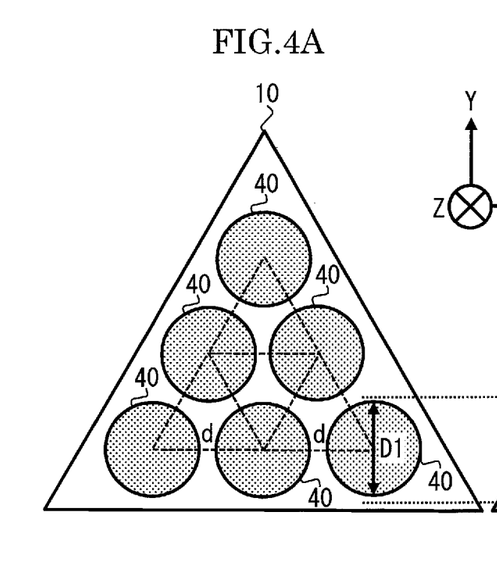
FIG. 4 are views illustrating one example of regions on which the adhesive is applied when the electrode films have a triangular shape and a circular shape.
Figure 4B:
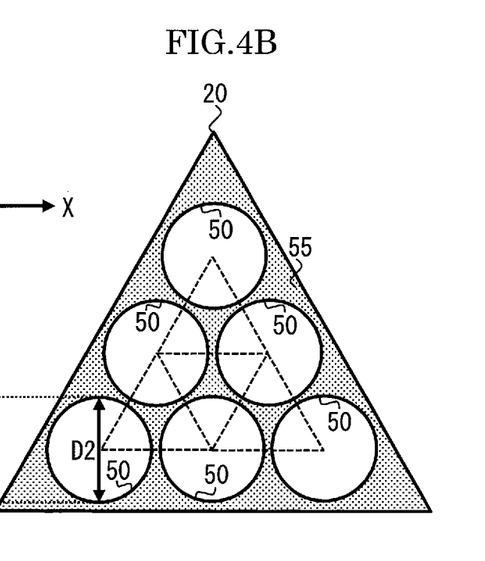
Figure 4C:
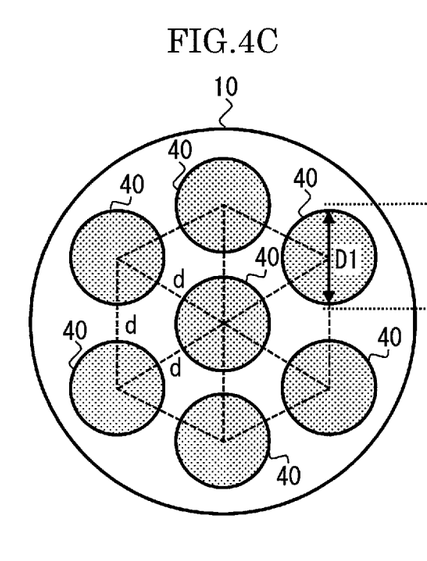
Figure 4D:
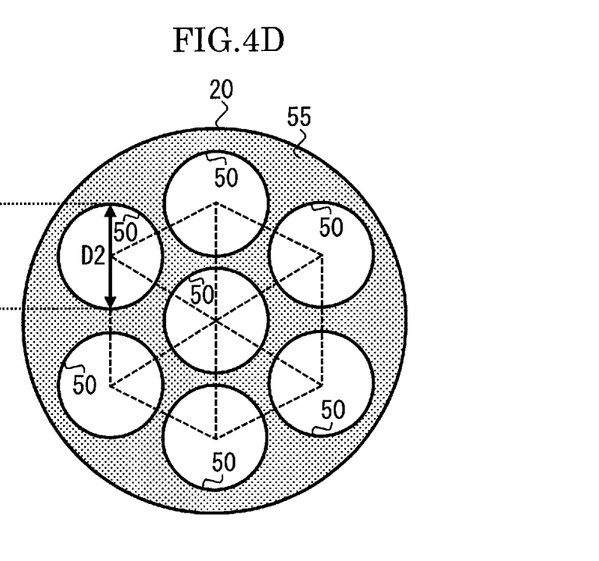
Figure 5A:
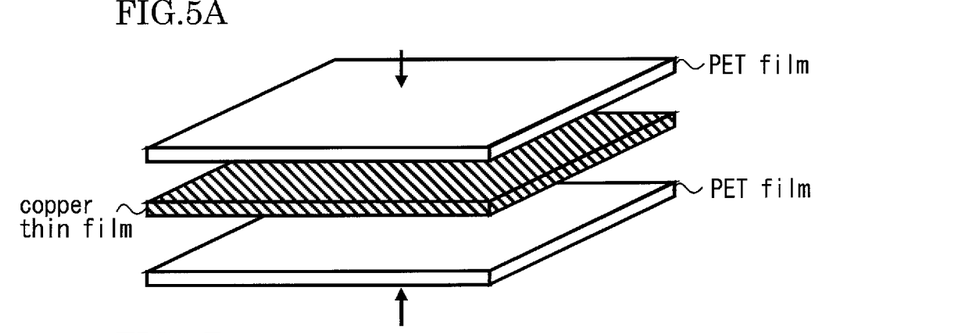
FIG. 5 are views illustrating one example of a manufacturing method of the electrostatic actuator illustrated in FIG. 1.
Figure 5B:
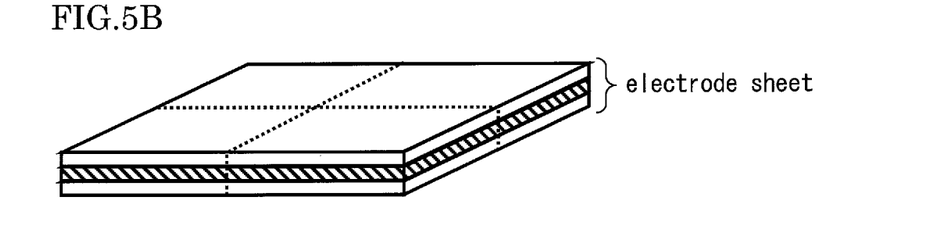
Figure 5C:
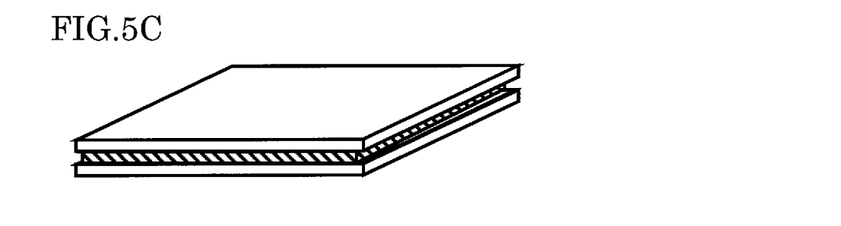
Figure 5D:
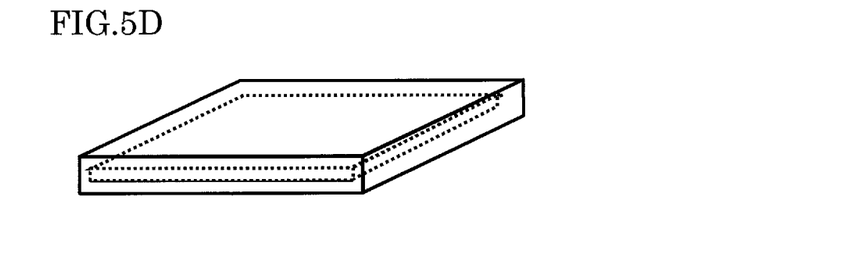

FIG. 4C illustrates a pattern in which the regions 40 on which the adhesive is applied are arranged when the electrode film 10 has a circular shape. For example, circular regions 40 each having a diameter D1 are arranged in a form of a hexagon at mutually equal intervals with a distance d. FIG. 4D illustrates a pattern of the region 55 on which the adhesive is applied when the electrode film 20 has a circular shape. For example, in the electrode film 20, circular regions 50 each having a diameter D2 and on which the adhesive is not applied are arranged at positions corresponding to those of the respective regions 40 illustrated in FIG. 4C (namely, positions arranged at mutually equal intervals with the distance d), and a region except for the circular regions 50 in the electrode film 20 corresponds to the region 55 on which the adhesive is applied.

Note that it is also possible that the regions 40 and 50 are not arranged at equal intervals with the distance d. For example, when the regions 40 and 50 are arranged in a biased manner, it is possible to generate the electrostatic actuator 100 which expands and contracts in a direction according to the bias.

FIG. 5 illustrate one example of a manufacturing method of the electrostatic actuator 100 illustrated in FIG. 1. For example, in order to generate the electrode films 10 and 20, an electrode sheet formed by sandwiching a copper thin film by PET films is generated (FIG. 5A). The electrode sheet illustrated in FIG. 5A is cut into a form of four plates along a dotted line in the drawing, for example (FIG. 5B). Subsequently, an etching process is performed on the respective electrode sheets cut into the form of plates illustrated in FIG. 5B (namely, the electrode films 10 and 20), to thereby remove the copper thin film exposed to a cut surface (FIG. 5C). The cut surface of the etched electrode sheet illustrated in FIG. 5C is bonded with PET films, and accordingly, the electrode sheet is generated as each of the electrode films 10 and 20 (FIG. 5D).

Note that although each of the electrode films 10 and 20 is formed in a square shape in FIG. 5, it may also be formed in a rectangular shape in which a length in an X axis direction is longer than a length in a Y axis direction. In this case, the adhesive is applied on one surface of the electrode film 10 in a pattern of the regions 40 so that a part of the electrode film 10 protrudes in a positive direction of the X axis when the film is stacked. Meanwhile, the adhesive is applied on one surface of the electrode film 20 in a pattern of the region 55 so that a part of the electrode film 20 protrudes in a negative direction of the X axis when the film is stacked. It is also possible to design such that after the films are stacked, for example, a hole is opened on a part of each of the electrode films 10 protruded in the positive direction of the X axis, and a conductive coating material or the like is poured into the hole, resulting in that the respective electrode films 10 are connected so that voltages each having the same polarity are applied thereto. Further, it is also possible to design such that a hole is opened on a part of each of the electrode films 20 protruded in the negative direction of the X axis, and a conductive coating material or the like is poured into the hole, resulting in that the respective electrode films 20 are connected so that voltages each having a polarity different from that of the electrode film 10 are applied thereto.

Subsequently, on one surface of each of the electrode films 10 and 20, the adhesive is applied in the pattern illustrated in FIG. 2, for example. By using print processing of relief printing, offset printing, stencil printing, or the like, for example, the adhesive is applied on each of the regions 40 of the electrode film 10 and the region 55 of the electrode film 20. Alternatively, it is also possible that an ink jet printer or the like is used to apply the adhesive on each of the regions 40 of the electrode film 10 and the region 55 of the electrode film 20. Accordingly, even when an area of the electrode films 10 and 20 is increased, it becomes possible to apply the adhesive on regions in predetermined patterns such as the regions 40 and 55, with accuracy higher than before. Further, it is possible to suppress an individual difference of the expanding and contracting operation for each electrostatic actuator 100.

Note that the adhesive is previously applied on one surface of each of the electrode films 10 and 20 in the pattern of the regions 40 or 55, and then the films are stacked, but, the present invention is not limited to this. For example, it is also possible to design such that on a surface on the positive side of the Z axis of the electrode film 10 (or the electrode film 20) stacked and fixed in the Z axis direction, the adhesive is applied in the pattern of the regions 40 (or the region 55), and the following electrode film 20 (or electrode film 10) is placed and bonded. Specifically, by applying the adhesive on the regions 40 in a state where the electrode film 10 stacked immediately before does not move, accurate positioning between the electrode films 10 and 20 becomes unnecessary.

Subsequently, by alternately stacking the electrode films 10 and 20 on which the adhesive is applied in the patterns illustrated in FIG. 2, the electrostatic actuator 100 illustrated in FIG. 1 is generated.

As described above, in the embodiment illustrated in FIG. 1 to FIG. 5, the electrostatic actuator 100 is generated by alternately stacking the electrode films 10 and 20 in which the adhesive is applied on the regions 40 or the region 55 arranged in the predetermined pattern. Since the adhesive is applied in the predetermined patterns on the respective electrode films 10 and 20 by the print processing, even when the area of the electrode films 10 and 20 is increased, the electrostatic actuator 100 can be generated more easily when compared to a conventional one.

The disk spring structures are formed by the regions 40 of the electrode film 10, the regions 50 of the electrode film 20, and the gaps each having the width ΔD. Consequently, the electrostatic actuator 100 can maintain the distance between the electrode films 10 and 20 to within a predetermined range (specifically, 2ΔD), and can maintain the electrostatic force between the electrode films 10 and 20 in the spaces Sa and Sb to a predetermined value or more.

By using the print processing, it becomes possible to apply the adhesive on the respective electrode films 10 and 20, with accuracy higher than before. As a result of this, the electrostatic actuator 100 can uniformize the expanding and contracting operation between the electrode films 10 and 20 in the respective layers, and it is possible to suppress an individual difference for each electrostatic actuator 100.

Figure 6:
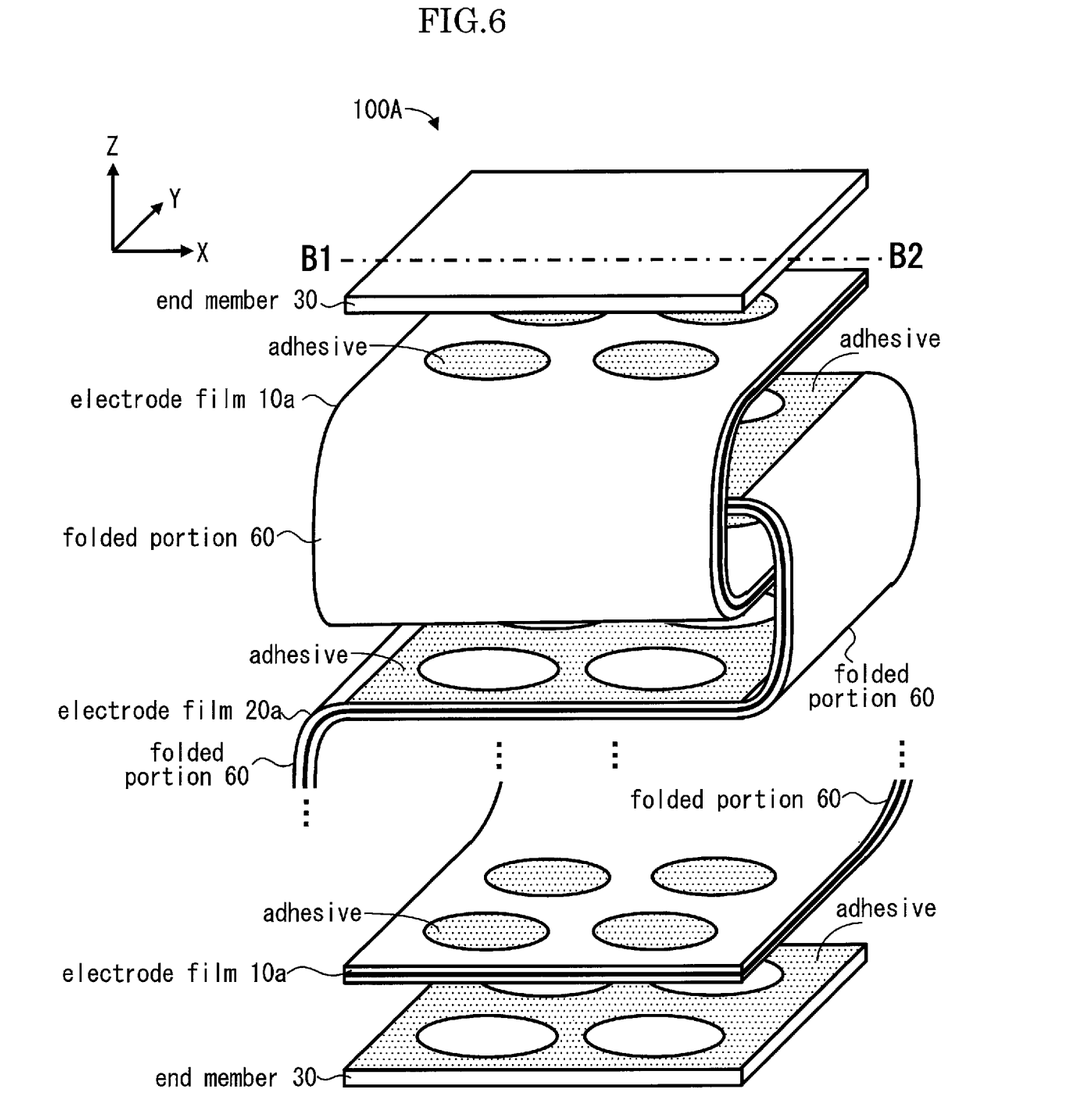
FIG. 6 is a view illustrating another embodiment of the electrostatic actuator.

FIG. 6 illustrates another embodiment of the electrostatic actuator. The same or similar elements as or to the elements described in FIG. 1 are denoted by the same or similar reference numerals, and detailed explanation thereof will be omitted.

In an electrostatic actuator 100A illustrated in FIG. 6, electrode films 10a and 20a on each of which an adhesive indicated by a half-tone dot meshing is applied, are stacked in the Z axis direction in a manner that they are folded in a zigzag form while being crossed each other. The stacked electrode films 10a and 20a are sandwiched by the two end members 30 made of acrylic plates or the like.

Each of the electrode films 10a and 20a is a strip-shaped electrode formed by sandwiching a metal film of copper or the like by dielectric films such as PET films, for example. A thickness of each of the electrode films 10a and 20a is, for example, 8 micrometers or the like. In the electrode film 10a, the adhesive of silylated urethane or the like is applied in the pattern illustrated in FIG. 2A on a surface to be an upper side surface in the Z axis direction when the film is folded in a zigzag form, for example. In the electrode film 20a, the adhesive is applied in the pattern illustrated in FIG.

2B on a surface to be an upper side surface in the Z axis direction when the film is folded in a zigzag form. The application of the adhesive on the respective electrode films 10a and 20a will be described using FIG. 9.

Subsequently, the electrode film 10a and the electrode film 20a are folded in a zigzag form while being crossed each other, resulting in that the electrodes of the respective layers in the electrostatic actuator 100A are stacked in the Z axis direction, and at the same time, folded portions 60 are generated. For this reason, in the electrostatic actuator 100A, the electrodes of the respective layers on which the adhesive is applied in the same pattern (namely, the electrodes of the respective layers to which the voltages with the same polarity are applied) are mutually connected via the folded portions 60, and thus it becomes easy to perform wiring of the electrostatic actuator 100A.

Figure 7:
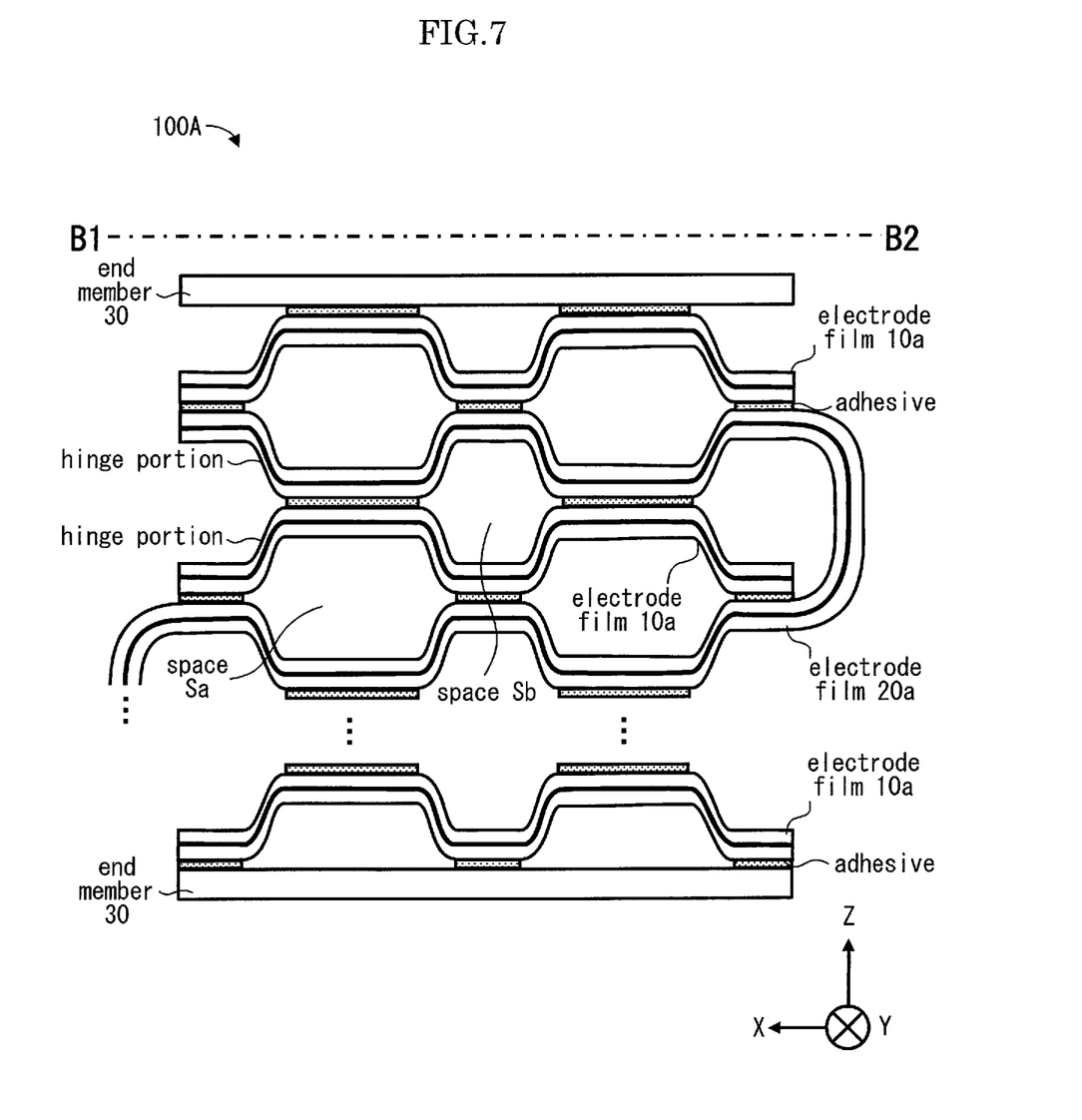
FIG. 7 is a view illustrating one example of a cross section of the electrostatic actuator in an XZ plane along a line segment illustrated in FIG. 6.

FIG. 7 illustrates one example of a cross section of the electrostatic actuator 100A in an XZ plane along a line segment B1-B2 illustrated in FIG. 6. In the electrostatic actuator 100A, similarly to the electrostatic actuator 100 illustrated in FIG. 1, the gap with the width ΔD illustrated in FIG. 2 operates as the hinge portion, and there are provided a plurality of spaces Sa with disk spring structures formed by the regions 40 of the electrode film 10a, the regions 50 of the electrode film 20a, and the gaps each having the width ΔD. The electrostatic actuator 100A also has a plurality of spaces Sb in each of which the gap with the width ΔD is set to the hinge portion. Note that the positional relationship between the spaces Sa and the spaces Sb in the XZ plane is similar to that of the example in FIG. 3.

For example, when voltages with mutually different polarities are applied to the electrode films 10a and 20a, respectively, electrostatic forces between the electrode films 10a and 20a in the spaces Sa and Sb are attracted to each other (specifically, the spaces Sa and Sb contract in the Z axis direction). On the other hand, when voltages each having the same polarity are applied to the electrode films 10a and 20a, respectively, the electrostatic forces between the electrode films 10a and 20a in the spaces Sa and Sb repel each other (specifically, the spaces Sa and Sb expand in the Z axis direction). Accordingly, the electrostatic actuator 100A expands and contracts.

Since the electrostatic actuator 100A has the plurality of spaces Sa with the disk spring structures, it can maintain the distance between the electrode films 10a and 20a to within a predetermined range (specifically, 2ΔD), and can maintain the electrostatic force between the electrode films 10a and 20a in the spaces Sa and Sb to a predetermined value or more. Further, it is also possible that the folded portion 60 is also made to operate as the hinge portion together with the gap with the width ΔD.

FIGS. 8 and 9 illustrate one example of a manufacturing method of the electrostatic actuator 100A. For example, in order to generate the electrode films 10a and 20a, an electrode sheet formed by sandwiching a copper thin film by PET films is generated (FIG. 8A), similarly to the electrode films 10 and 20 illustrated in FIG. 5A. The electrode sheet illustrated in FIG. 8A is cut into a form of strip along a dotted line in the drawing, for example (FIG. 8B). Subsequently, an etching process is performed on the electrode sheets cut into the form of strip illustrated in FIG. 8B (namely, the electrode films 10a and 20a), to thereby remove the copper thin film exposed to a cut surface (FIG. 8C). The cut surface of the etched electrode sheet illustrated in FIG. 8C is bonded with PET films, and accordingly, the electrode sheet is generated as each of the electrode films 10a and 20a.

Figure 8A:
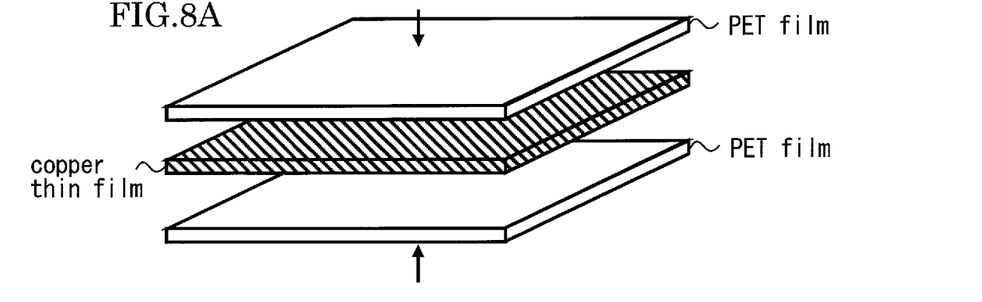
FIG. 8 are views illustrating one example of a manufacturing method of the electrostatic actuator illustrated in FIG. 6.
Figure 8B:
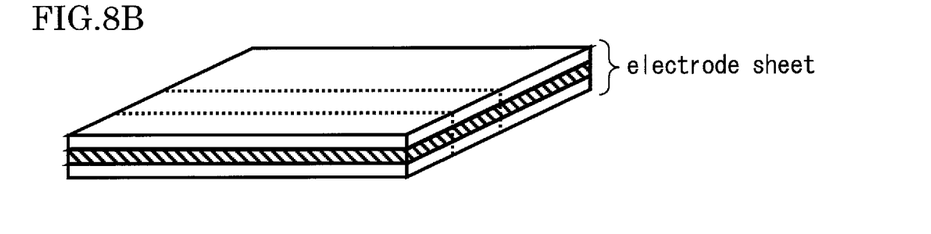
Figure 8C:
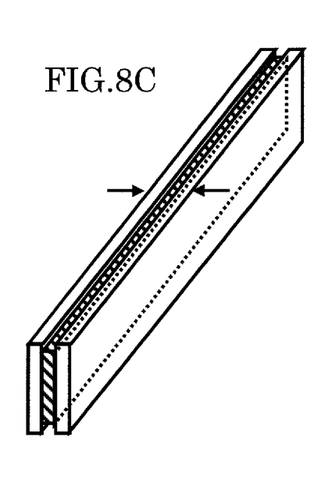
Figure 8D:
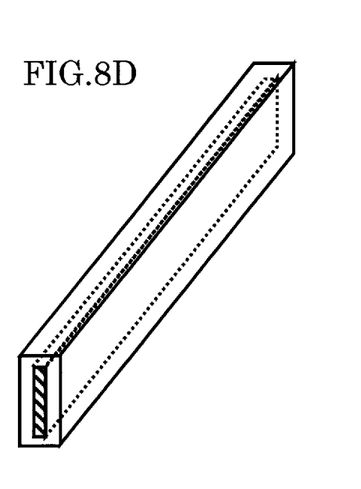
Figure 9A:
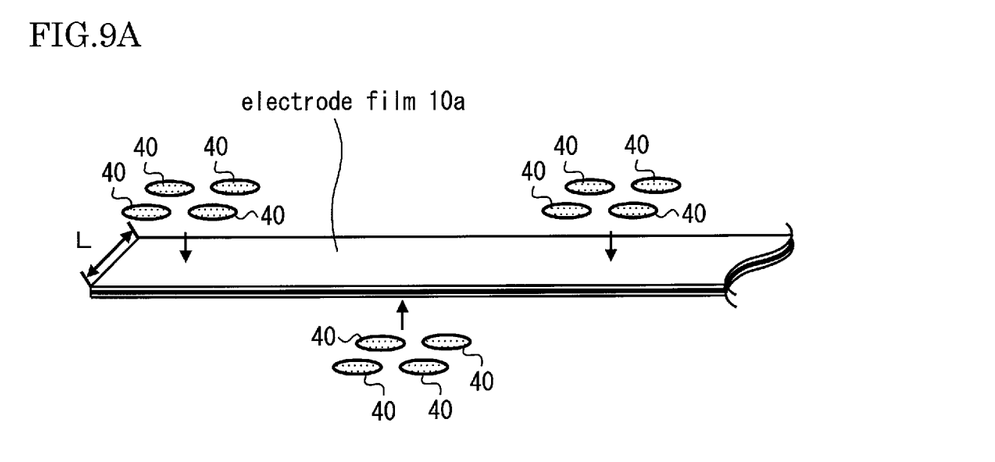
FIG. 9 are views illustrating a continuation of the manufacturing method illustrated in FIG. 8.
Figure 9B:
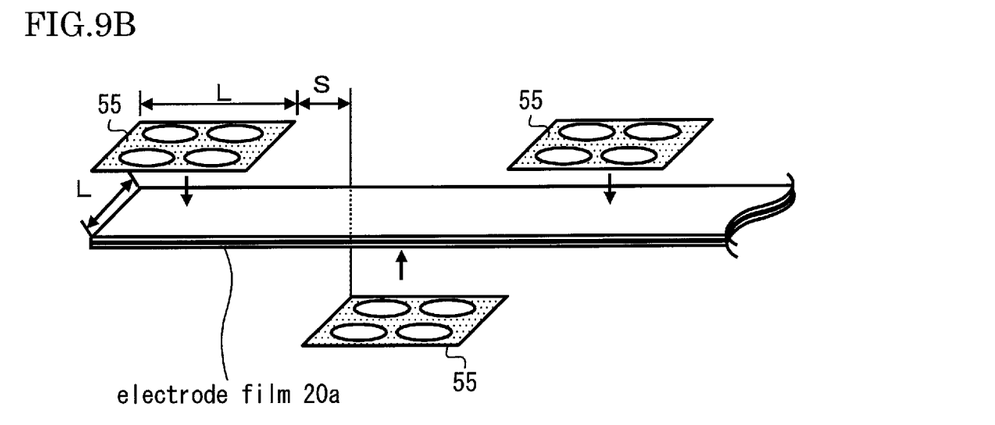

Subsequently, on each of the generated electrode films 10a and 20a illustrated in FIG. 8D, the adhesive is applied in the pattern illustrated in FIG. 2, for example. Specifically, on both surfaces (an upper surface and a lower surface in the drawing) of the electrode film 10a, the adhesive is applied on the regions 40 in the pattern illustrated in FIG. 2A so that the surfaces on which the adhesive is applied are directed in the same direction when the film is folded in a zigzag form, as illustrated in FIG. 9A. At this time, on the upper surface and the lower surface, respectively, of the electrode film 10a, the adhesive is applied in the pattern of the regions 40 at predetermined intervals, and the place on which the adhesive is applied on the upper surface and the place on which the adhesive is applied on the lower surface of the electrode film 10a are alternately displaced. In the electrode film 20a, the adhesive is applied on the region 55 in the pattern illustrated in FIG. 2B, as illustrated in FIG. 9B. At this time, on the upper surface and the lower surface, respectively, of the electrode film 20a, the adhesive is applied in the pattern of the region 55 at predetermined intervals, and the place on which the adhesive is applied on the upper surface and the place on which the adhesive is applied on the lower surface of the electrode film 20a are alternately displaced.

Note that as illustrated in FIG. 9, when each of the electrode films 10a and 20a has a width L, a length of each of the patterns illustrated in FIG. 2 in a direction in which the electrode films 10a and 20a extend (in the horizontal direction in the drawing) is also set to L. An interval between the adjacent patterns (namely, a length of the folded portion 60) is set to a length S. On a certain surface of each of the electrode films 10a and 20a, an interval between regions on which the adhesive is applied becomes 2S+L. An interval between the regions on which the adhesive is applied between one surface and the other surface of each of the electrode films 10a and 20a becomes S. A width of each of the electrode films 10a and 20a in the folded portion 60 may also be narrower than the width L.

The adhesive is applied on the electrode films 10a and 20a by using print processing of relief printing, offset printing, stencil printing, or the like, for example. Alternatively, it is also possible that an ink jet printer or the like is used to apply the adhesive on each of the electrode films 10a and 20a. Accordingly, even when an area of the electrode films 10a and 20a is increased, it becomes possible to apply the adhesive on regions in predetermined patterns such as the regions 40 and 55, with accuracy higher than before. Further, it is possible to suppress an individual difference of the expanding and contracting operation for each electrostatic actuator 100A.

Subsequently, the electrode films 10a and 20a illustrated in FIG. 9 are folded in a zigzag form by being arranged in a mutually crossed manner, and thus the electrostatic actuator 100A illustrated in FIG. 6 is generated.

As described above, in the embodiment illustrated in FIG. 6 to FIG. 9, the electrostatic actuator 100A is generated in a manner that the electrode films 10a and 20a in each of which the adhesive is applied on the regions 40 or the region 55 arranged in the predetermined pattern are stacked so as to be folded in a zigzag form while being crossed each other. Since the adhesive is applied in the predetermined patterns on the respective electrode films 10a and 20a by the print processing, even when the area of the electrode films 10a and 20a is increased, the electrostatic actuator 100A can be generated more easily when compared to a conventional one.

The disk spring structures are formed by the regions 40 of the electrode film 10a, the regions 50 of the electrode film 20a, and the gaps each having the width ΔD. Consequently, the electrostatic actuator 100A can maintain the distance between the electrode films 10a and 20a to within a predetermined range (specifically, 2ΔD), and can maintain the electrostatic force between the electrode films 10a and 20a in the spaces Sa and Sb to a predetermined value or more.

By using the print processing, it becomes possible to apply the adhesive on the respective electrode films 10a and 20a, with accuracy higher than before. As a result of this, the electrostatic actuator 100A can uniformize the expanding and contracting operation between the electrode films 10a and 20a in the respective layers, and it is possible to suppress an individual difference for each electrostatic actuator 100A.

Since the electrostatic actuator 100A is generated in a manner that the electrode film 10a and the electrode film 20a are folded in a zigzag form while being crossed each other, the folded portions 60 are generated. For this reason, in the electrostatic actuator 100A, the electrodes of the respective layers to which the voltages with the same polarity are applied are mutually connected via the folded portions 60, and thus it becomes easy to perform wiring of the electrostatic actuator 100A.

The above detailed description should clarify features and advantages of the embodiments. This intends that the claims cover features and advantages of the embodiments as described above within a range not departing from the spirit and the scope of right thereof. Further, since various modifications and changes should readily occur to those having ordinary knowledge in the art, it is not intended to limit the range of the inventive embodiments to the above-described one, and it is also possible to use appropriate modifications and equivalents included in the scope disclosed in the embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

EXPLANATION OF REFERENCE NUMERALS 10, 10a, 20, 20a . . . Electrode film; 30 . . . End member; 40, 50, 55 . . . Region; 60 . . . Folded portion; 100, 100A . . . Electrostatic actuator

The invention claimed is:

1. A manufacturing method of an electrostatic actuator, comprising:
   generating a plurality of electrode plates sandwiched by dielectrics having a predetermined thickness;
   using a part of the plurality of electrode plates as a plurality of first electrode plates and applying an adhesive on one surface of each of the plurality of first electrode plates in a first pattern;
   using the rest of the plurality of electrode plates as a plurality of second electrode plates and applying the adhesive on one surface of each of the plurality of second electrode plates in a second pattern which is different from the first pattern; and
   alternately stacking the plurality of first electrode plates and the plurality of second electrode plates in a stack direction without causing the surfaces on which the adhesive is applied to face each other in the stack direction, such that the first and second electrode plates are aligned when viewed in the stack direction.

2. The manufacturing method of the electrostatic actuator according to claim 1, wherein the adhesive is applied by print processing.

3. An electrostatic actuator, comprising, stacked in the following order:
   a first electrode plate;
   a first adhesive layer arranged in a first pattern including an adhesive region and an empty region;
   a second electrode plate; and
   a second adhesive layer arranged in a second pattern different from the first pattern, the second pattern including an adhesive region and an empty region,
   wherein the adhesive region of the first pattern and empty region of the second pattern have a same shape and a different size, and are aligned with each other in a stack direction.

4. The electrostatic actuator according to claim 3, wherein:
   the first pattern has a plurality of the adhesive regions arranged at equal intervals,
   the second pattern has a plurality of empty regions, and
   a center of each of the adhesive regions of the first pattern and a center of each of the empty regions of the second pattern are aligned in the stack direction.

5. The electrostatic actuator according to claim 3, wherein an area of the adhesive region of the first pattern is equal to an area of the adhesive region of the second pattern.

6. The electrostatic actuator according to claim 3, wherein the shape is any one of a circular shape, an oval shape, and a shape of a polygon with rounded corners.

* * * * *